United States Patent [19]

Schmitt

[11] Patent Number: 5,309,780

[45] Date of Patent: May 10, 1994

[54] TORQUE LIMITING HEADLAMP ADJUSTOR

[75] Inventor: Karl R. Schmitt, Rockford, Ill.

[73] Assignee: Textron Inc., Providence, R.I.

[21] Appl. No.: 962,490

[22] Filed: Oct. 15, 1992

[51] Int. Cl.$^5$ .................. B60Q 1/06; F16H 25/24
[52] U.S. Cl. .................. 74/89.13; 74/89.15; 74/441; 362/66; 362/69; 411/275
[58] Field of Search .......... 74/89.13, 89.15, 441; 362/66, 69; 411/230, 274, 275

[56] References Cited

U.S. PATENT DOCUMENTS

| 900,796 | 10/1908 | Tambling | 411/27.5 X |
| 3,949,880 | 4/1976 | Fortunato | 411/230 X |
| 4,674,018 | 6/1987 | Ryder et al. | 362/424 |
| 4,757,429 | 7/1988 | Ryder et al. | 362/69 |
| 4,893,219 | 1/1990 | Lisak | 362/66 |
| 4,939,945 | 6/1990 | Ryder et al. | 74/89.13 |
| 5,023,759 | 6/1991 | Eckenrode | 362/66 |
| 5,034,870 | 7/1991 | Weber | 362/66 |
| 5,079,676 | 1/1992 | Lisak | 362/61 |
| 5,161,877 | 11/1992 | Wright et al. | 362/66 |

FOREIGN PATENT DOCUMENTS

| 3602263 | 10/1986 | Fed. Rep. of Germany | 362/66 |
| 501432 | 2/1951 | France | 411/275 |
| 2609315 | 7/1987 | France | 411/230 |
| 395331 | 10/1931 | United Kingdom | 411/275 |

Primary Examiner—Allan D. Herrmann
Attorney, Agent, or Firm—Trexler, Bushnell, Giangiorgi & Blackstone, Ltd.

[57] ABSTRACT

A headlamp adjusting mechanism having a housing member with a passage formed therethrough and an independent nut body is retained in the housing member. The independent nut body has a threaded aperture which is substantially coincident with the passage in the housing. An elongated threaded shaft extends through the passage in the housing and cooperatively engages the threaded aperture in the independent nut body. An assembly for driving the elongated shaft such as a mitered gear arrangement is operatively associated with the housing. The driving assembly transfers motion applied to the assembly to rotate the elongated shaft cooperatively engaged with the threaded aperture in the independent nut body to produce axial displacement of the elongated shaft through the passage. A friction or prevailing torque increasing device is provided on the housing for canting or forcibly angling the independent nut body to increase the frictional forces between the threaded bore in the independent nut body and the threaded surface of the shaft. The increased friction between the independent nut body and the shaft not only increases the prevailing torque, but eliminates all axial play and prevents angular deflection of the shaft. The friction increasing device is sized and dimensioned to control the degree of prevailing torque between the independent nut body and the shaft.

19 Claims, 1 Drawing Sheet

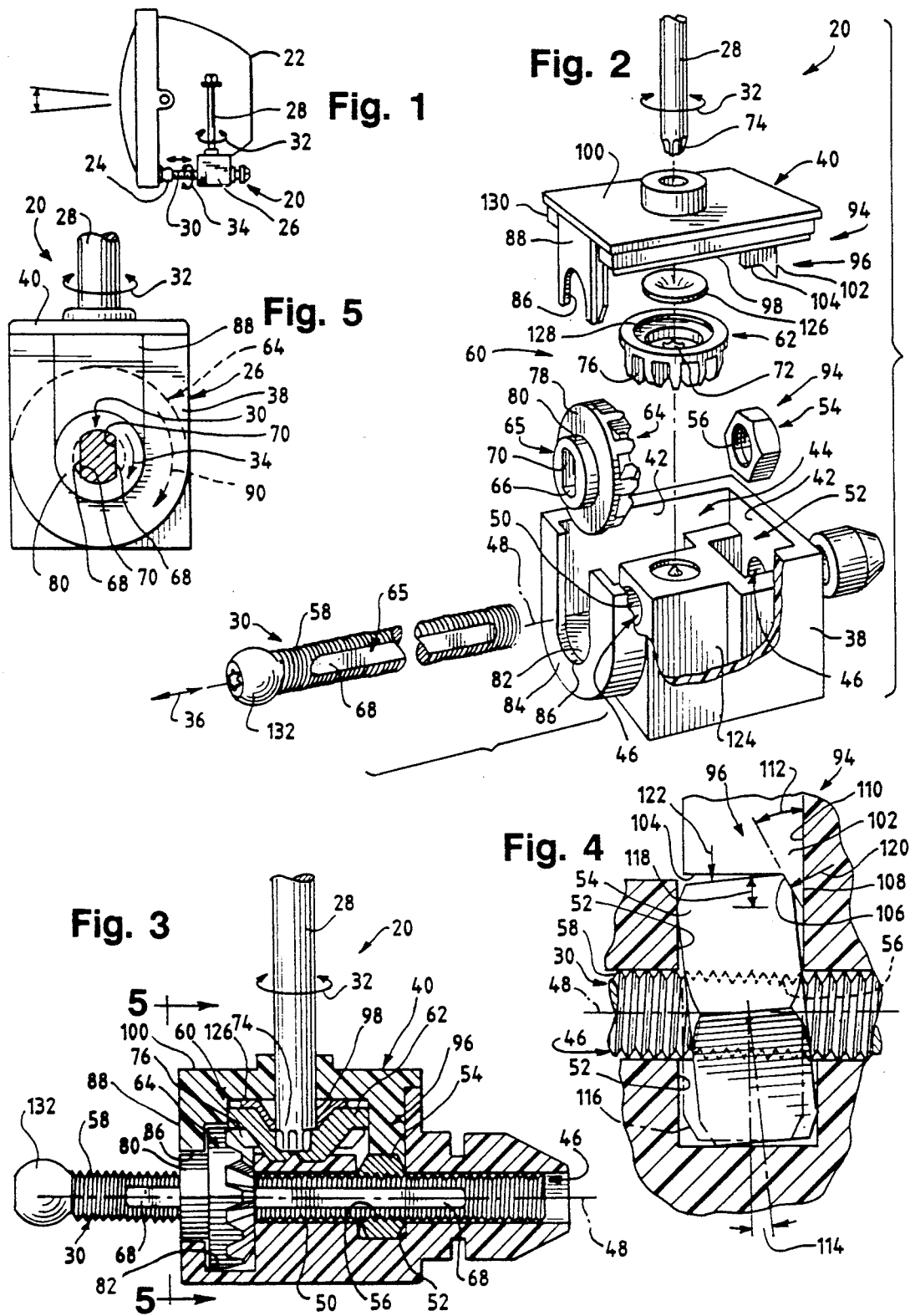

TORQUE LIMITING HEADLAMP ADJUSTOR

BACKGROUND OF THE INVENTION

The present invention relates to adjusting mechanisms for use with a headlamp to adjust the position of a headlamp and retain the desired adjusted position.

A variety of headlamp adjusting mechanisms are currently available. These mechanisms typically provide a housing and a gearing arrangement retained in the housing for transferring rotary motion in one direction to a linear motion in another direction. The purpose for transferring rotary motion into linear motion is to control the movement and adjustment of the headlamp from a more conveniently accessible position. The remote control of the adjustment of the headlamp enables a variety of angular relationships to be achieved between a point where a user controls the adjustment of the headlamp and another point at which the adjustment actually occurs.

The angular relationships that can be achieved using a headlamp adjusting mechanism is very important to the automobile industry. In the automobile industry, space limitations for components in the operating compartment, or engine compartment, is very limited. As such, it is advantageous to provide a conveniently accessible adjusting point to adjust a remote and somewhat inaccessible headlamp adjusting mechanism.

A variety of headlamp adjusting mechanisms have been produced to provide remote adjustment of a headlamp. The following list provides an example of some known devices:

| Inventor | U.S. Pat. No. | Issued |
| --- | --- | --- |
| Lisak | 5,079,676 | 01/07/92 |
| Weber | 5,034,870 | 07/23/91 |
| Eckenrode | 5,023,759 | 06/11/91 |
| Ryder et al. | 4,939,945 | 07/10/91 |
| Lisak | 4,893,219 | 01/09/90 |
| Ryder et al. | 4,757,429 | 07/12/88 |
| Ryder et al. | 4,674,018 | 06/16/87 |

The devices as shown in Eckenrode and Weber directly transfer forces from a driving assembly to move a shaft axially through the housing. The other references presented hereinabove rotate and axially displace a shaft.

Each of the devices presented hereinabove includes an arrangement whereby a threaded shaft engages a cooperatively formed threaded bore to axially displace the threaded shaft through the housing. Each of the devices uses a specialized bushing or gear member having a tapped bore to provide cooperative threads for engaging the threaded shaft. A problem arises with these devices such that the specialized bushing or gear are not readily available and must be produced or molded especially for this application. As such, the cost of such bushings or gears can be quite expensive. Additionally, since these specialized bushings and gear members are specifically produced for this application, they may not be readily available and may create production problems if they become unavailable.

Prior art headlamp adjusting devices also attempt to provide additional friction or prevailing torque to retain a desired adjustment during use. In this regard, road and engine vibration will tend to move the components out of adjustment if the threaded engagement is free running. To this end, many devices provide such friction or prevailing torque but require numerous additional parts and locking devices to achieve the desired friction requirements. For example, several devices employ plastic bushings and thread portions of the housing to increase effective thread length through which the threaded shaft travels to increase the frictional engagement between the shaft and the threads. While this increased thread length may provide a degree of increased friction to retain the desired adjustment, the threads experience a degree of axial play and possibly deflection. Therefore, while the shaft may be prevented from the rotary movement, the shaft still moves forward and backward along the axis extending through the shaft. Such axial play is undesired as it potentially results in undesired adjustment of the headlamp attached to the headlamp adjusting mechanism.

Another problem encountered with the prior art headlamp adjusting mechanisms is axial deflection. As shown in the device in Eckenrode and Weber, the shaft is only retained over a short section in the threaded bushing retained in the housing. As such, there is a degree of axial deflection which may occur with this device. A variety of prior art devices which employ bushings may somewhat reduce the axial deflection, however, there is still some potential for the bushing in which the shaft is retained to axially deflect within the bore tapped in the housing.

As mentioned above, some prior art devices employ threaded sections of the housing to provide threaded engagement between the shaft and the housing. A commonly used material for the housing is plastic so that the weight, cost and time for production is minimized. While most plastic bushings rely upon a self tapping arrangement, viz., the metal thread cold forms the plastic material, if a thread is formed through a section of the housing, an error in tapping the thread through the housing makes the housing unusable for an adjusting mechanism. As such, the potential for scrap housings may be quite high. Additionally, the threads generally have a greater potential for stripping in the plastic material than if the housings were formed from a metallic material. While devices which use a tapped gear often times provide a metallic gear and therefore a metallic threaded surface, such gears can be quite expensive to produce and may create a supply problem as mentioned hereinabove.

Prior art devices also have a problem in that the degree of prevailing torque or friction employed to prevent movement of the shaft is not readily controllable. The components which control the prevailing torque, the specialized threaded bushings and specialized threaded gears, do not lend themselves to varying degrees of prevailing torque. For example, one way to change the degree of prevailing torque between the threaded shaft and the specialized bushings and gears would be to provide some kind of friction device on the gears to provide resistance against adjustment, as disclosed in U.S. patent application No. 07/800,536, filed Nov. 27, 1991, now U.S. Pat. No. 5,161,877. As mentioned above, however, this solution does not resolve the problem of axial play in the threaded shaft.

Another way to control the degree of prevailing torque imposed on the threaded shaft might be to alter the tolerances between the threaded shaft and the specialized threaded bushings or gears. This solution, however, results in further specialization of the bushings, threaded gears, and threaded shaft and therefore does not solve the problems of costs and availability.

One further prior art device provides a threaded shaft which has a partially spherical end for engaging a cooperatively formed socket attached to a headlamp. The shaft is axially displaced by means of a gearing arrangement in the housing of the adjusting mechanism. The shaft is prevented from rotating by a number of wings or ears protruding from the partially spherical end of the shaft. The wings or ears engage cooperatively formed slots in the socket. This device provides a degree of multi-directional movement between a partially spherical and the shaft and the socket. It is believed that this is provided to increase the prevailing torque or resistance to adjustment of the shaft in the adjusting mechanism housing. This device has a potential problem, however, such that the wings or ears are prone to being broken off if not properly installed in the socket.

OBJECTS AND SUMMARY OF THE INVENTION

A general object of the present invention is to provide a headlamp adjusting mechanism which prevents undesired adjustment and prevents axial play and deflection of the shaft in the mechanism.

Another object of the present invention is to provide a headlamp adjusting mechanism which eliminates the need to provide a tapped housing, specialized bushing, or specialized tapped gear.

A further object of the present invention is to provide a headlamp adjusting mechanism which increases the strength of the assembly and increases the control of the prevailing torque provided in the assembly.

Still another object of the present invention is to reduce the cost of the mechanism and improve the availability of the components used in the mechanism.

Briefly, and in accordance with the foregoing, the present invention envisions a headlamp adjusting mechanism having a housing member with a passage formed therethrough and an independent nut body is retained in the housing member. The independent nut body has a threaded aperture which is substantially coincident with the passage in the housing. An elongated threaded adjusting shaft extends through the passage in the housing and cooperatively engages the threaded aperture in the independent nut body. An assembly for driving the elongated shaft such as a mitered gear arrangement is operatively associated with the housing. The driving assembly transfers motion applied to the assembly to rotate the elongated shaft cooperatively engaged with the threaded aperture in the independent nut body to produce axial displacement of the elongated shaft through the passage. A friction or prevailing torque increasing device is provided on the housing for canting or forcibly angling the independent nut body. This forcible angling or canting of the nut body in effect removes or overcomes the play or tolerances in the threads thereby increasing the frictional forces between the threads on the independent nut body and those on the shaft. The increased friction between the independent nut body and the shaft not only increases the prevailing torque, but eliminates all axial play and prevents axial deflection of the shaft. The friction increasing device is sized and dimensioned to control the degree of friction between the independent nut body and the shaft.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which:

FIG. 1 is a schematic side elevational view of a headlamp adjusting mechanism according to the invention coupled to a headlamp for adjusting the alignment of the headlamp;

FIG. 2 is an exploded perspective view of the headlamp adjusting mechanism shown in FIG. 1;

FIG. 3 is a partial fragmentary, cross sectional view of the headlamp adjusting mechanism shown in FIG. 1;

FIG. 4 is an enlarged, partial fragmentary, cross sectional view of a friction increaser wedged against an independent nut body non-rotatably retained in a housing member for increasing frictional forces between the independent nut body and a threaded shaft extending therethrough; and FIG. 5 is a partial cross sectional side elevational view taken along line 5—5 in FIG. 3 showing planar faces of the threaded element engaged with corresponding planar faces in a keyed bore extending through a gear of the headlamp adjusting mechanism.

DETAILED DESCRIPTION OF THE INVENTION

While the invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

Referring now to the drawings, wherein like parts are designated by the same reference numeral throughout the figures, a headlamp adjusting mechanism 20 in accordance with the present invention is shown in FIG. 1, somewhat schematically, attached to a headlamp 22 by a ball socket joint 24. The headlamp adjusting mechanism 20 includes a housing member 26, a drive shaft 28 and a threaded adjustment shaft 30. The drive shaft 28 is rotatable (as indicated by arrow 32) and the elongated threaded adjustment shaft or adjustment shaft 30 is rotatable and axially displaceable (as indicated by arrows 34, 36 respectively). Thus, when it is desired to adjust the headlamp, a mechanic can rotate the drive shaft 28 with an appropriate tool to produce axial displacement of shaft 30 to vary the vertical orientation of lamp 22.

With further reference to the exploded perspective view of FIG. 2, the housing member 26 includes a wall portion 38 and a cap 40. The wall portion 38 includes several connecting walls 42 which define a primary cavity 44. With further reference to FIG. 3, a passage 46 is formed through the cavity 44 and has a central axis 48 longitudinally extending through the passage 46.

The adjusting shaft 30 extends through the passage 46 coaxial with the central axis 48. The passage 46 is not threaded and is, instead, formed with smooth walls or internal surfaces 50. Wall portions within the housing member 26 define a receptacle 52 for receiving an independent nut body 54. The receptacle or chamber 52 is sized and dimensioned so that when the independent nut body 54 is placed in the receptacle 52, the independent nut body 54 is prevented from rotating. A toothed or threaded aperture 56 is formed through the independent nut body 54 and is substantially coincident with the passage 46 and the central axis 48 when placed in the receptacle 52. The adjusting shaft 30 has a threaded surface 58 which is cooperatively formed to engage the threaded aperture 56 of the independent nut body 54. When the shaft 30 is rotated (arrow 34) the threaded surface 58 engages the threaded aperture 56 to drive or displace the shaft 30 through the passage 46 along the central axis 48. This occurs due to the fact that the nut body 54 is held against rotation by the side walls of the receptacle or chamber 52.

The adjusting shaft 30 is driven by means of a driving arrangement or drive means 60. As shown in the figures, a preferred form of the drive means 60 for driving the adjusting shaft 30 includes the drive shaft 28, a drive gear 62, an adjustment gear 64, and means 65 for circumferentially retaining the shaft 30 in a gear bore 66 extending through the adjustment gear 64. The drive means 60, and in particular, the adjustment gear 64 are not directly keyed or attached to the independent nut body 54. The means 65 for circumferentially retaining the shaft 30 in the gear bore 66 includes one or more planar surfaces 68 formed on the shaft 30, and corresponding flats 70 formed in the gear bore 66. The drive gear 62 includes a mating receptacle 72 for receiving a driving end 74 of the drive shaft 28. The drive gear 62 and adjustment gear 64 have gear teeth 76 which mesh to transfer forces in an angular relationship.

The adjustment gear 64 has a body portion 78 and a neck 80. A gear cradle 82 is formed in a wall 42 of the wall portion 38 of the housing 26. The cradle 82 includes a rim 84 which defines a collar opening 86. The adjustment gear 64 is disposed in the cradle 82 with an outside surface of the neck 80 abutting the collar opening 86 of the rim 84. When positioned in the cradle 82, the gear bore 70 of the adjustment gear 64 is generally coincident with the passage 46 and the central axis 48. The cap 40 includes a cover extension 88 which cooperatively mates with the rim 84 of the cradle 82 to securely retain the adjustment gear 64 in the cradle 82.

With the components of the headlamp adjusting mechanism 20 assembled as shown in FIG. 3, rotation (arrow 32) of the drive shaft 28 transfers forces from the drive gear 62 to the adjustment gear 64. Rotation (as indicated by phantom arrow 90 as shown in FIG. 5) of the adjustment gear 64 rotates (36) the threaded shaft 30 which is cooperatively engaged with the adjustment gear 64. The engagement between the adjustment gear 64 and the shaft 30 is achieved by the planar surfaces 68 of the shaft being retained by the gear flats 70 of the gear bore 66. The surfaces 68,70 are sized and dimensioned to prevent the shaft 30 from freely rotating within the bore 66, yet permit the adjusting shaft 30 to move axially along the bore 66. As such, rotation (90) of the adjustment gear 64 rotates (34) the shaft 30.

Although the shaft 30 cannot rotate within the gear bore 66, it does rotate (34) within the threaded aperture 56 of the independent nut body 54 which is held against rotation. Additionally, engagement of the planar surface 68 with the gear flat 70 does not prohibit axial movement of the shaft 30 through the gear bore 66 along the central axis 48. As such, rotation (90) of the adjustment gear 64 rotates (34) the shaft 30 and rotation (34) of the shaft 30 through the engagement thereof with the independent nut body 54 causes axial displacement (36) of the shaft 30 along the central axis 48.

Frictional forces or prevailing torque on the shaft 30 are controlled by means 94 for increasing friction between the engaged threads of shaft 30 and nut 54 (hereinafter referred to as friction increasing means). The friction increasing means 94 includes a protruding segment 96 extending from an internal side 98 of the cap 40. The cap 40 is formed with an external side 100 and the internal side 98 such that when the cap 40 is mounted to the wall portion 38, the housing 26 is sealed to protect the components making up the headlamp adjusting mechanism 20.

With further reference to the enlarged detailed view as shown in FIG. 4, the protruding segment 96 includes a wedge segment 102 extending from a flat segment 104. As shown in FIG. 4, a first side or angled side 106 of the wedge segment 102 abuts a corresponding portion of the independent nut body 54. A second side 108 of the wedge 102 abuts an inside surface 110 of the primary cavity 44 of the wall portion 38. A wedge angle 112 is defined between the angled side 106 and the second side 108.

The second side 108 of the wedge segment 102 is formed generally parallel to the inside surface 110 with the angled side 106 angled away from the second side 108 so that parallel engagement of the second side 108 and the inside surface 110 facilitates wedged engagement of the wedge segment 102 between the independent nut body 54 and the inside surface 110. Engagement of the wedge segment 102 between the independent nut body 54 and the housing 26 causes the independent nut body 54 to be canted or angled relative to the threaded shaft 30. An angle of canting 114 is defined by the angle at which the independent nut body 54 is moved relative to a non-wedge position (as shown by phantom nut body 116 in FIG. 4) prior to wedging.

The wedge angle 112 and a wedge length dimension 118 can be controllably varied to produce desired prevailing torque between the threaded aperture 56 of the independent nut body 54 and the threaded surface 58 of the shaft 30. An additional factor in controlling the prevailing torque between the independent nut body 54 and the shaft 50 is the size and dimension of the flat 104. The dimensions of the flat 104 can be controllably varied to further control the prevailing torque between the threaded aperture 56 and the threaded surface 58. The wedge segment 102 creates an angular force (as shown by vector arrow 120) angularly canting the nut body 54 in the receptacle 52. The flat 104 creates a compressive force (as indicated by arrow 122) downwardly forcing the independent nut body 54 into the receptacle 52.

The effect of the wedge segment 102 and the flat 104 is to increase the frictional forces between the threaded surface 58 of the shaft 30 and the threaded aperture 56 of the independent nut body 54. As the independent nut body 54 is canted in the receptacle 52, the frictional forces between the threaded surface 58 and threaded aperture 56 increases. Similarly, the frictional engaging forces between the surface and aperture 58,56 increases as the compressive force 122 increases. As the independent nut body 54 is canted by the wedge segment 54 and compressed by the flat 104, the threads in the aperture 56 and the threaded surface 58 on the shaft 30 are forced into more intimate engagement. The increased engagement of the threaded portions essentially eliminates all axial play and axial deflection of the shaft 30.

Use of the independent nut body 54 also increases the standardization of components used in the headlamp adjusting mechanism 20. The standard sized independent nut 54 having a standardized thread eliminates the need for specialized threaded bushings or gears. Further, since the independent nut 54 and the shaft 30 are metallic, the strength and wear resistance of the assembly is substantially increased compared to a similar shaft engaged with a threaded bore in the plastic material of a housing. Additionally, since the independent nut body 54 and the shaft 30 are metallic, increased forces may be applied to the independent nut body 54 in canting and compressing the independent nut body 54 in the receptacle 52 thereby allowing greater forces to be applied to the independent nut body 54 and the shaft 30.

In use, the wall portion 38 and the cap 40 of the housing member 26 are formed of a plastic material. Assembly of the present invention is extremely simple such that the independent nut body 54 is dropped into the receptacle 52 and automatically locks into position coincident with the passage 46 and central axis 48 without any deliberate manual adjustments. The independent nut body 54 thus positioned and retained is held against rotation. The adjustment gear 64 is similarly dropped into the cradle 82 so that neck 80 is retained in the collar opening 86 of the rim 84. Next, the drive gear 62 is positioned on an upstanding base portion 124 of the housing 26 so that the teeth 76 on the drive gear 62 and the adjustment gear 64 are meshed. A retaining washer 126 can be positioned in a recess 128 in the drive gear 62 so that when the drive shaft 28 is inserted through the cap 40, the retaining washer 126 prevents removal of the drive shaft 28 therefrom.

The cap 40 with a wedge segment 102 and a flat 104 of a selected angle 112 and dimension 118 is inserted over the primary cavity 44 of the wall portion 38. The cover extension 88 mates with the collar opening 86 and engages the neck 80 of the adjustment gear 64. A cooperatively formed perimeter 130 of the cap 40 engages the wall portion 38 with the wedge segment 102 being positioned between an inside surface 110 and the independent nut body 54. When the cap 40 is positioned in a desired location on the wall portion 38, it is ultrasonically welded or attached by other means to seal the housing 26.

With the housing 26 assembled with the gear components 62,64 and the independent nut body 54 disposed therein, the shaft 30 is inserted through the gear bore 66 of the adjustment gear 64. The planar surface 66 of the shaft 30 must be appropriately aligned with the gear flat 70 formed inside the gear bore 66 to permit threading of the shaft 30 in the bore 66. The shaft 30 is slidably inserted through the passage 46 until it is threadedly engaged with bore 66 of the independent nut body 54. The drive shaft 28 is rotated to cause engagement of the threaded surface 58 with the threaded aperture 56.

The assembled headlamp adjusting mechanism 20 is attached to a headlamp 22 by means of the ball and socket joint 24. To this end, a spherical ball 132 on an end of the shaft 30 distal the independent nut body 54 is engaged with a cooperatively formed socket 24 attached to the headlamp 22. The drive shaft 28 is rotated (32) to operate the gears 62,64 thereby rotating (34) and axially displacing 36 the shaft 30. The headlamp adjusting mechanism 20 of the present invention as assembled, installed, and adjusted as described is highly resistant to vibrational forces encountered while driving the vehicle and substantially resists undesirable adjustment. Further, the prevailing torque created between the independent nut body 54 and the shaft 30 prevents axial play in the shaft 30 once a desired adjustment is achieved. The engagement and frictional forces between the independent nut body 54 and the shaft 30 additionally prevents angular deflection (side to side movement and up and down movement) of the shaft 30 in the housing 26. Further, additional advantages are attained because the present design does not rely upon ears on the ball end 132 to be engaged with the socket 24 to prevent rotation. Initially, there is no concern about proper assembly of the socket and spherical end 132. Secondly, since the spherical end 132 will rotate in the socket 24, additional prevailing torque or friction can be attained between the socket 24 and the spherical end 132.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. A headlamp adjusting mechanism comprising:
   a housing having a passage formed therein;
   an internally threaded member non-rotatably retained in said housing member, said internally threaded member having a threaded aperture extending therethrough, said threaded aperture being positioned substantially coincident with said passage;
   an elongated adjusting shaft having a threaded surface disposed on an outer surface thereof, said threaded surface cooperatively engaging said threaded aperture in said internally threaded member, said adjusting shaft being disposed in said passage of said housing and cooperatively engaging said threaded aperture of said internally threaded member;
   means for driving said elongated adjusting shaft, said driving means being operatively associated with said shaft for transferring driving forces provided thereby to drive said shaft cooperatively engaged with said threaded aperture in said internally threaded member, driving of said shaft in said internally threaded member producing axial displacement of said shaft; and
   means for increasing friction between said shaft and said internally threaded member, said friction increasing means applying forces to said internally threaded member to cant said internally threaded member in said housing for increasing frictional forces between said member and said shaft.

2. A headlamp adjusting mechanism as recited in claim 1, wherein said friction increasing means applies forces to said internally threaded member, and said internally threaded member is an independent nut body.

3. A headlamp adjusting mechanism comprising:
   a housing having a passage formed therein;
   an internally threaded member non-rotatably retained in said housing, said internally threaded member having a threaded aperture extending therethrough, said threaded aperture being positioned substantially coincident with said passage;
   an elongated adjusting shaft having a threaded surface disposed on an outer surface thereof, said threaded surface cooperatively engaging said threaded aperture in said internally threaded member, said adjusting shaft being disposed in said passage of said housing and cooperatively engaging said threaded aperture of said internally threaded member; and means for driving said elongated adjusting shaft, said driving means being operatively associated with said shaft for transferring driving forces provided thereby to drive said shaft cooperatively engaged with said threaded aperture in said internally threaded member, driving of said shaft in said internally threaded member producing axial displacement of said shaft;

means for increasing friction between said shaft and said internally threaded member, said friction increasing means applying forces to at least one of said shaft and said internally threaded member for increasing frictional forces between said internally threaded member and said shaft;

a wedge protruding from said housing for wedging between said internally threaded member and an abutting surface of said housing, said wedge being positioned and retained between said internally threaded member and said abutting surface of said housing for canting said internally threaded member in engagement with said adjusting shaft to controllably increase the prevailing torque developed between the threads of said internally threaded member and the threads of said adjusting shaft.

4. A headlamp adjusting mechanism as recited in claim 3 said friction increasing means further comprising:

a flat segment protruding from said housing and associated with said wedge for applying compressive forces to said internally threaded member, said flat segment contacting said internally threaded member when said wedge is positioned between said internally threaded member and an abutting surface of said housing for controllably increasing the prevailing torque developed between the threads of said internally threaded member and the threads of said adjusting shaft.

5. A headlamp adjusting mechanism comprising:

a housing having a passage formed therein;

an internally threaded member non-rotatably retained in said housing, said internally threaded member having a threaded aperture extending therethrough, said threaded aperture being positioned substantially coincident with said passage;

an elongated adjusting shaft having a threaded surface disposed on an outer surface thereof, said threaded surface cooperatively engaging said threaded aperture in said internally threaded member, said adjusting shaft being disposed in said passage of said housing and cooperatively engaging said threaded aperture of said internally threaded member; and means for driving said elongated adjusting shaft, said driving means being operatively associated with said shaft for transferring driving forces provided thereby to drive said shaft cooperatively engaged with said threaded aperture in said internally threaded member, driving of said shaft in said internally threaded member producing axial displacement of said shaft;

a central axis extending longitudinally through said shaft and said passage;

said driving means including at least one gear movably displaced in said housing, said gear having a gear bore formed therethrough for receiving said shaft; and means for circumferentially retaining said shaft in said gear bore cooperatively positioned on said gear bore and on a corresponding surface of said shaft, said circumferential retaining means inducing rotation of said shaft about said central axis upon rotating said gear and allowing axial displacement of said shaft through said gear bore upon being rotated relative to said internally threaded member.

6. A headlamp adjusting mechanism as recited in claim 5, said circumferential retaining means further comprising:

a longitudinal planar surface positioned on an outside surface of said shaft; and a keyed gear bore surface engaging said planar shaft surface for circumferentially retaining said shaft in said gear bore to promote axial displacement of said shaft through said passage.

7. An adjusting mechanism for use with a headlamp comprising:

a housing having a passage formed therein;

a central axis extending longitudinally through said passage;

an independent nut body retained in said housing, said nut body having a threaded aperture extending therethrough substantially coincident with said passage;

a threaded adjusting shaft extending through said passage of said housing generally coincident with said central axis and engaging said threaded aperture of said nut body;

means for driving said threaded shaft, said driving means cooperatively engaging said threaded shaft for transferring motion provided by said driving means to rotate said threaded shaft in said nut body, rotation of said threaded shaft in said threaded aperture producing axial displacement of said threaded shaft through said passage along said central axis; and means for increasing frictional forces between said threaded shaft and said nut body, said friction increasing means applying forces to said nut body to cant said nut body in said housing for increasing frictional forces between the engaged threaded portions on said nut body and said threaded shaft to reduce axial, angular, and rotary movement in said threaded shaft.

8. An adjusting mechanism as recited in claim 7, said threaded shaft and said nut body being formed of a metallic material having a resistance to frictional wear.

9. An adjusting mechanism for use with a headlamp comprising:

a housing having a passage formed therein;

a central axis extending longitudinally through said passage;

an independent nut body retained in said housing, said nut body having a threaded aperture extending therethrough substantially coincident with said passage;

a threaded adjusting shaft extending through said passage of said housing generally coincident with said central axis and engaging said threaded aperture of said nut body;

means for driving said threaded shaft, said driving means cooperatively engaging said threaded shaft for transferring motion provided by said driving means to rotate said threaded shaft in said nut body, rotation of said threaded shaft in said threaded aperture producing axial displacement of said threaded shaft through said passage along said central axis; and means for increasing frictional forces between said threaded shaft and said nut body, said friction increasing means applying forces to at least one of said threaded shaft and said nut body for increasing frictional forces between the engaged threaded portions on said nut body and said threaded shaft to reduce axial, angular, and rotary movement in said threaded shaft;

an adjustment gear disposed in said housing operatively associated with said threaded shaft, said adjustment gear having a gear bore formed therein;

at least one planar surface in said gear bore of said adjustment gear defining at least one gear flat;

at least one planar surface on said threaded shaft defining at least one shaft flat extending longitudinally along said threaded shaft corresponding to and cooperatively engaging a corresponding one of said at least one gear flat; and said shaft flat cooperatively engaging said gear flat for transferring motion provided by said rotating means to rotate said threaded shaft in said nut body, rotation of said threaded shaft in said nut body producing corresponding axial displacement of said threaded shaft through said passage of said housing.

10. An adjusting mechanism for use with a headlamp comprising:

a housing having a passage formed therein;

a central axis extending longitudinally through said passage;

an independent nut body retained in said housing, said nut body having a threaded aperture extending therethrough substantially coincident with said passage;

a threaded adjusting shaft extending through said passage of said housing generally coincident with said central axis and engaging said threaded aperture of said nut body;

means for driving said threaded shaft, said driving means cooperatively engaging said threaded shaft for transferring motion provided by said driving means to rotate said threaded shaft in said nut body, rotation of said threaded shaft in said threaded aperture producing axial displacement of said threaded shaft through said passage along said central axis; and means for increasing frictional forces between said threaded shaft and said nut body, said friction increasing means applying forces to at least one of said threaded shaft and said nut body for increasing frictional forces between the engaged threaded portions on said nut body and said threaded shaft to reduce axial, angular, and rotary movement in said threaded shaft;

an adjustment gear disposed in said housing operatively associated with said threaded shaft;

a drive gear disposed in said housing and operatively meshed with said adjustment gear; and rotational forces applied to said drive gear being transferred to said adjustment gear for rotating said threaded shaft.

11. An adjusting mechanism for use with a headlamp comprising:

a housing having a passage formed therein;

a central axis extending longitudinally through said passage;

an independent nut body retained in said housing, said nut body having a threaded aperture extending therethrough substantially coincident with said passage;

a threaded adjusting shaft extending through said passage of said housing generally coincident with said central axis and engaging said threaded aperture of said nut body;

means for driving said threaded shaft, said driving means cooperatively engaging said threaded shaft for transferring motion provided by said driving means to rotate said threaded shaft in said nut body, rotation of said threaded shaft in said threaded aperture producing axial displacement of said threaded shaft through said passage along said central axis; and means for increasing frictional forces between said threaded shaft and said nut body, said friction increasing means applying forces to at least one of said threaded shaft and said nut body for increasing frictional forces between the engaged threaded portions on said nut body and said threaded shaft to reduce axial, angular, and rotary movement in said threaded shaft;

a friction increaser attached to and extending from said housing, said friction increaser wedging against said nut body for canting said nut body relative to an abutting surface of said housing for increasing the frictional forces between said threaded shaft and said nut body to reduce dimensional play in said threaded shaft.

12. An adjusting mechanism as recited in claim 11, wherein said housing includes a body portion having walls defining a primary cavity and a cap overlying said primary cavity; said cap having an external side and an internal side, said friction increaser extending from said internal side of said cap and projecting into said primary cavity for wedging between a wall of said body portion and said nut body retained in said housing for canting said nut body relative to said threaded shaft.

13. An adjusting mechanism as recited in claim 12, wherein said friction increaser defines a wedge shaped protrusion extending from said internal side of said cap, a tip on said wedge shaped protrusion distal said cap, a wedge angle defining the shape of said wedge, said wedge angle being controllably variable such that a prespecified wedge angle will provide a prespecified degree of prevailing torque between the threaded portions.

14. An adjusting mechanism as recited in claim 13, said friction increaser further comprising:

a flat segment protruding from said housing portion and associated with said wedge for applying compressive forces to said nut body, said flat segment contacting said nut body when said wedge is positioned between said nut body and an abutting surface of said housing for controllably increasing the prevailing torque developed between the threads of said nut body engaged with the threads of said adjusting shaft.

15. An adjusting mechanism for use with a headlamp comprising:

a housing having a body portion including walls defining a primary cavity and a nut receptacle, said body portion having a passage formed therein, said passage having a central axis extending therethrough; and a cap segment overlying said primary cavity and said nut receptacle;

an independent nut body retained in said nut receptacle in said body portion, said nut body having a threaded aperture extending therethrough generally coincident with said central axis;

a threaded shaft positioned in said housing member extending through said passage and engaging said threaded aperture of said nut body;

at least one gear operatively associated with said threaded shaft for rotating said threaded shaft when said gear is rotated, said gear cooperatively engaging said threaded shaft for transferring motion imposed on said gear to rotate said threaded shaft in said threaded aperture, rotation of said threaded shaft in said threaded aperture of said nut body producing axial displacement of said threaded shaft through said passage; and a friction increaser attached to and extending from said cap and projecting into said nut receptacle and wedging between a wall of said body portion and said nut body for canting said nut body relatively to said threaded shaft to increase the frictional forces between said nut body and said threaded shaft.

16. A headlamp adjusting mechanism comprising:

a housing;

a wall of said housing having a passage formed therethrough;

a threaded nut non-rotatably disposed in said housing, a threaded aperture of said nut being generally coincident with said passage;

a shaft disposed in said passage and operatively associated with said nut;

means for driving said shaft operatively associated with said shaft; and means for increasing frictional forces between said shaft and said nut, said friction increasing means applying forces to said nut to cant said nut relative to said shaft for increasing the frictional forces between operatively associated surfaces of said shaft and said nut.

17. A headlamp adjusting mechanism as recited in claim 16, said friction increasing means comprising a wedge body disposed relative to said nut and said housing for wedging between neighboring surfaces of said nut and said housing for canting said nut relative to said housing.

18. A headlamp adjusting mechanism as recited in claim 16, said friction increasing means comprising a wedge body protruding from a first portion of said housing, said wedge body extending between said nut and a second portion of said housing for providing a canting action on said nut relative to said housing, said canting action increasing frictional forces between operatively associated surfaces of said shaft and said nut.

19. A headlamp adjusting mechanism as recited in claim 16, a central axis defined as extending said shaft through said passage; said driving means including at least gear operatively disposed in said housing, said gear having an aperture formed therethrough, said shaft disposed in said aperture; and means for retaining said shaft relative to said aperture, said retaining means transferring rotary motion of said gear to said shaft and allowing axial displacement of said shaft through said aperture upon rotating said gear.

* * * * *